United States Patent [19]

Freller et al.

[11] Patent Number: 4,532,174
[45] Date of Patent: Jul. 30, 1985

[54] LAYER SYSTEM FOR OPTO-ELECTRONIC DISPLAYS

[75] Inventors: Helmut Freller, Röthenbach; Heinrich Hässler, Wendelstein; Peter Schack, Nuremberg; Ludwig Schultz, Buckenhof, all of Fed. Rep. of Germany

[73] Assignee: Siemens Aktiengesellschaft, Munich, Fed. Rep. of Germany

[21] Appl. No.: 509,805

[22] Filed: Jun. 30, 1983

[30] Foreign Application Priority Data

Jul. 26, 1982 [DE] Fed. Rep. of Germany ....... 3227898

[51] Int. Cl.³ .......................... B32B 7/02; B32B 15/04
[52] U.S. Cl. .................................. 428/215; 428/433; 428/469; 428/701
[58] Field of Search ................ 428/469, 701, 433, 215

[56] References Cited

U.S. PATENT DOCUMENTS 4,345,000 8/1982 Kawazoe et al. ............... 428/701 X
4,399,194 8/1983 Zeleg et al. ..................... 428/469 X

OTHER PUBLICATIONS

A. Sabnis, Electrocomponent Science and Technology, 1980, vol. 7, pp. 19-22.
G. Haacke et al., Thin Solid Films, 55, 5/1978, pp. 67-81.
J. B. Webb, J. Vac. Sci. Technology, 20(3), Mar. 1982, pp. 467-468.

Primary Examiner—Thomas J. Herbert
Attorney, Agent, or Firm—Kenyon & Kenyon

[57] ABSTRACT

A simplified, easily producible, strongly adherent, solderable and corrosion resistant layer system for opto-electronic displays is produced by vapor deposition techniques. In accordance with the invention, the layer system is formed of two layers; a transparent first layer formed of a nonsolderable oxide semiconductor, such as $In_2O_3SnO_2$, and a second layer formed of a solderable, oxidation-resistant material, which is formed at least partially of a copper alloy containing an alloying additive consisting of a metal which is less noble than copper, illustratively CuMg.

8 Claims, 1 Drawing Figure

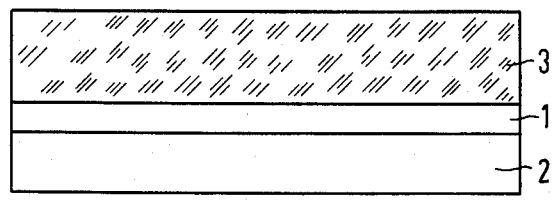

LAYER SYSTEM FOR OPTO-ELECTRONIC DISPLAYS

BACKGROUND OF THE INVENTION

This invention relates generally to layer systems for opto-electronic displays, and more particularly, to a simplified, strongly adhering, solderable, and corrosion resistant layer system for opto-electronic displays.

Known multiple-layer systems for opto-electronic displays consist of four layers; a transparent oxide semiconductor layer which is not solderable, such as $In_2O_3 \cdot SnO_2$, an adhesion agent layer, such as Cr, Ti, Mn, the solder layer itself, which may be formed of copper, and a corrosion or oxidation protection layer which prevents the surface of the conducting layer from corroding or oxidizing during storage or during certain manufacturing steps. These known multilayer systems require a large number of operating steps during the coating and subsequent etching-structuring processes which are performed in different baths. Moreover, since several materials must be available for sputter targets, such multilayer systems are generally very costly.

It is, therefore, an object of this invention to provide a simplified layer system of the type discussed hereinabove which can be produced with considerably fewer operating steps.

SUMMARY OF THE INVENTION

The foregoing and other objects are achieved by this invention which provides a transparent first layer which is not solderable and formed of an oxide semiconductor material. A second layer which is solderable and oxidation-resistant is provided which consists at least partially of a copper alloy having one or several alloying additives of metals which are less noble than copper.

Alloying additives which have been found to be particularly suitable in the practice of the invention are, for example, magnesium, aluminum, beryllium, gallium, germanium, silicon, tin, zinc, zirconium and chromium. In one embodiment, the alloying additive is added in an amount corresponding to between 0.2 to 10 atom percent, and preferably between 1.5 to 2 atom percent. As is known, indium oxide/tin oxide is provided as the oxide semiconductor material.

It is surprising that only a limited portion of the solderable second layer, illustratively about the last quarter or third, must consist of a copper alloy, while the main portion of the layer may consist of pure copper. Advantageous results are achieved if the thickness of the first layer is between 25 to 500 nm, and the thickness of the second layer is between 200 to 1200 nm.

In accordance with the invention, the number of operating steps required is reduced by providing only one additional layer on the transparent oxide semiconductor layer. The main component of the additional layer is copper and contains secondary components which have good adhesion to the transparent oxide semiconductor layer, as well as substantially improved oxidation resistance, as compared to pure copper.

The metal additives which are suitable for this purpose must be considerably less noble than copper, and oxidize while forming a cover layer which is as free of pores and compact as possible. Diffusion-inhibiting barrier layers are then produced for preventing oxygen diffusion into the interior of the layer.

The metal additives form a homogeneous solid solution (mixed crystals) as well as heterogeneous precipitation alloys with the base metal of copper. The additives may be added singly, and also in combinations of the above-mentioned metals, such that the alloying additives added to copper should be between 0.2 to 10 atom percent, and preferably between 1.5 to 2 atom percent. This guarantees sufficient oxidation protection, and thereby solderability, without unduly reducing the solderability.

It is an advantage of the present invention that both layers can be generated one after the other in one and the same vacuum process.

Since these alloys still correspond to a pure Cu layer as far as their etching behavior is concerned, but are about five times better than Cu 99.99 with respect to their oxidation resistance up to temperatures of 523° K., there results a simplification of the etching steps and a better tolerance of thermal stresses in the layer system during fabrication of the displays. The reduced oxidation has the effect that the thickness of the solder layer can be reduced from about 3000 nm of pure Cu to 800 to 1200 nm, which affords considerable savings and cost in terms of material and fabrication time.

BRIEF DESCRIPTION OF THE DRAWING

Comprehension of the invention is facilitated by reading the following detailed description in conjunction with the annexed drawing which is a schematic illustration of one embodiment of the invention.

DETAILED DESCRIPTION

The FIGURE depicts a schematic illustration of a layer system constructed in accordance with the invention. A transparent first layer 1, which is formed of an oxide semiconductor material which is not solderable, illustratively of $In_2O_3SnO_2$, and a solderable oxidation-resistant second layer 2, illustratively of CuMg, are provided. The layer system is applied to a glass substrate 3.

In accordance with the layer sequence of the invention, glass substrates of suitable glasses, such as borosilicate glasses or sodium silicate glasses having a quartz glass or borosilicate glass cover, are placed in a vacuum system. In one vacuum process, the transparent indium oxide/tin oxide semiconductor layer (20 to 200 nm) as well as the subsequent thicker solder layer of CuMg (1200 to 2000 nm) is applied by cathode sputtering at a pressure of $8 \times 10^{-3}$ mbar. The different thicknesses and different sputtering rates for indium oxide/tin oxide (approximately 2 nm/s) and Cu (30 nm/s) require different coating times with stationary coating. If the coating is carried out in a continuous system, which operates with the same coating time for both layers, several sputter sources for CuMg must be provided in order to obtain the layer structure in accordance with the invention in one pass.

If solder layer 2 is to consist in its major part of pure copper, and only about one-third of the layer of one of the supplied copper alloys, this layer structure is obtained, in a continuous system, by providing only the last sputter source of this alloy material.

Although the invention has been described in terms of specific embodiments and applications, persons skilled in the art, in light of this teaching, can generate additional embodiments without departing from the spirit or exceeding the scope of the claimed invention. Accordingly, it is to be understood that the drawing and description in this disclosure are proffered to facili-

What is claimed is:

1. In a layer system for opto-electronic displays of the type having a first layer formed of a transparent, not solderable oxide semiconductor material the improvement comprising a second layer formed of a solderable oxidation-resistant material formed at least partially of a copper alloy having at least one alloying additive consisting of a metal which is less noble than copper and selected from the group of magnesium, aluminum, beryllium, gallium, germanium, silicon, tin, zinc, zirconium and chromium.

2. The layer system of claim 1 wherein the first layer has a thickness between 25 to 500 nm, and said second layer has a thickness of between 200 to 1200 nm.

3. The layer system of claim 1 wherein a portion of said second layer communicating with the atmosphere consists of between one-quarter to one-third of a copper alloy; the remainder of said second layer being essentially pure copper.

4. The layer system of claim 1 wherein second layer consists of CuMg.

5. The layer system of claim 1 wherein the first layer is $In_2O_3SnO_2$.

6. The layer system of claim 1 wherein said alloying additive is added in an amount corresponding to between 0.2 to 10 atom percent.

7. The layer system of claim 6 wherein said alloying additive is added in an amount corresponding to between 1.5 to 2 atom percent.

8. A layer system for opto-electronic displays comprising:
a first layer formed of $In_2O_3SnO_2$; and
a second layer formed of CuMg.

* * * * *